US00RE39922E

(19) United States
(12) Reissued Patent
Rainey

(10) Patent Number: US RE39,922 E
(45) Date of Reissued Patent: Nov. 20, 2007

(54) SEGMENTAL RETAINING WALL SYSTEM

(75) Inventor: Thomas L. Rainey, Marietta, GA (US)

(73) Assignee: Anchor Wall Systems, Inc., Minnetonka, MN (US)

(21) Appl. No.: 10/887,559

(22) Filed: Jul. 8, 2004

Related U.S. Patent Documents

Reissue of:
(64) Patent No.: 6,416,257
Issued: Jul. 9, 2002
Appl. No.: 09/339,132
Filed: Jun. 24, 1999

(51) Int. Cl.
*E02D 17/00* (2006.01)
*E04C 1/00* (2006.01)

(52) U.S. Cl. ..... 405/262; 405/286; 52/286; 52/603; 52/605; 52/607

(58) Field of Classification Search ..... 405/262, 405/284, 286; 52/603–605, 607, 283, 284, 52/286
See application file for complete search history.

(56) References Cited

U.S. PATENT DOCUMENTS

| | | | |
|---|---|---|---|
| 677,351 | A | 7/1901 | Haffner |
| 748,603 | A | 1/1904 | Henry |
| 1,130,324 | A | 3/1915 | Owen |
| 1,162,409 | A | 11/1915 | Shimer |
| 4,448,571 | A | 5/1984 | Eckels |
| 4,470,728 | A | 9/1984 | Broadbent |
| 4,490,075 | A | 12/1984 | Risi et al. |
| 4,530,622 | A | 7/1985 | Mercer |
| 4,601,148 | A | 7/1986 | Risi et al. |
| 4,815,897 | A | 3/1989 | Risi et al. |
| 4,824,293 | A | 4/1989 | Brown et al. |
| 4,914,876 | A | 4/1990 | Forsberg |
| 5,044,834 | A | 9/1991 | Janopaul, Jr. |
| 5,064,313 | A | 11/1991 | Risi et al. |
| 5,066,169 | A | 11/1991 | Gavin et al. |
| 5,248,226 | A | 9/1993 | Risi et al. |
| 5,257,880 | A | 11/1993 | Janopaul, Jr. |
| 5,294,216 | A | 3/1994 | Sievert |
| D350,611 | S | 9/1994 | Scales |
| 5,417,523 | A | 5/1995 | Scales |
| 5,511,910 | A | 4/1996 | Scales |
| 5,522,682 | A | 6/1996 | Egan |
| 5,540,525 | A | 7/1996 | Miller et al. |
| 5,568,998 | A | 10/1996 | Egan et al. |
| 5,568,999 | A | 10/1996 | Egan et al. |
| 5,580,191 | A | 12/1996 | Egan |
| 5,595,460 | A | 1/1997 | Miller et al. |
| 5,607,262 | A | 3/1997 | Martin |
| 5,619,318 | A | 4/1997 | Yamamoto et al. |

(Continued)

FOREIGN PATENT DOCUMENTS

| | | |
|---|---|---|
| EP | 1 726 721 | 11/2006 |
| GB | PCT/GB93/02549 | 12/1993 |
| WO | WO 94/23136 A | 10/1994 |

OTHER PUBLICATIONS

U.S. Pat. No. 6,089,793, Jul., 2000, Rainey (Withdrawn)
European Search Report mailed on Mar. 13, 2007.

*Primary Examiner*—Christopher J. Novosad
(74) *Attorney, Agent, or Firm*—Merchant & Gould P.C.

(57) ABSTRACT

A segmental retaining wall system comprising a plurality of wall blocks. Each wall block comprises an interior face for forming an interior surface of a segmental retaining wall, an exterior face for forming an exterior surface of the segmental retaining wall, first and second sides that extend from said exterior face to said interior face, a top surface, and a bottom surface. In addition, a plurality of wall blocks include apparatus for retaining a reinforcement member to the segmental retaining wall. In one arrangement, this apparatus comprises a channel that is defined by a front wall, a rear wall, and a channel bottom surface. This channel is provided in one of the faces and surfaces, and includes an inwardly extending shoulder.

18 Claims, 6 Drawing Sheets

U.S. PATENT DOCUMENTS 5,622,456 A 4/1997 Risi et al.
5,673,530 A 10/1997 Bailey, II
5,697,735 A 12/1997 Egan
5,827,015 A 10/1998 Woolford et al.
5,865,006 A 2/1999 Dawson
5,899,040 A 5/1999 Cerrato
5,921,715 A 7/1999 Rainey
6,224,295 B1 5/2001 Price et al.
6,679,656 B1 1/2004 Manthei

SEGMENTAL RETAINING WALL SYSTEM

Matter enclosed in heavy brackets [ ] appears in the original patent but forms no part of this reissue specification; matter printed in italics indicates the additions made by reissue.

[This is a continuation-in-part of U.S. patent application Ser. No. 09/049,627, filed Mar. 27, 1998 now U.S. Pat. No. 6,089,793.]

FIELD OF THE INVENTION

The invention relates generally to earth retaining walls. More particularly, the invention relates to a segmental retaining wall system comprising retaining means for attaching reinforcement members to the retaining wall.

BACKGROUND OF THE INVENTION

Segmental retaining walls commonly are used for architectural and site development applications. Such walls are subjected to very high pressures exerted by lateral movements of the soil, temperature and shrinkage effects, and seismic loads. Therefore, the wall is often tied into the backfill soil, typically with tensile reinforcement members. Usually, elongated structures, commonly referred to as geogrids or reinforcement fabrics, are used to provide this reinforcement. Geogrids often are configured in a lattice arrangement and are constructed of a metal or plastic, while reinforcement fabrics are constructed of a woven or non-woven polymer fibers or plastics. These reinforcement members typically extend rearwardly from the wall and into the soil to stabilize the soil against movement and thereby create a more stable soil mass which results in a more structurally secure retaining wall.

Although several different forms of reinforcement members have been developed, difficulties remain with respect to attachment of the members to retaining walls. In particular, the reinforcement members can shift out of position and be pulled away from the retaining wall due to movement of the soil. This difficulty especially can be problematic in areas of high seismic activity where a poorly secured gravity wall can topple. In response to this problem, several current retaining wall systems have been developed to retain geogrid reinforcement members. In one such system, rake shaped connector bars are positioned transversely in the center of the contact area between adjacent stacked blocks with the prongs of the connector bars extending through elongated apertures provided in the geogrid in position under normal conditions, this system of attachment provides a substantial drawback. Specifically, the geogrids of this system only extend along the back halves of the contact areas between the blocks. Although the geogrids are relatively thin, this partial insertion of the geogrids can cause the retaining wall to bow outwardly due to the aggregate thickness of the geogrids. As can be appreciated, this outward bowing can be substantial with tall retaining walls that require a multiplicity of geogrids. Aside from creating the impression of instability, this condition increases the likelihood of wall failure, particularly in response to seismic activity.

From the above, it can be appreciated that it would be desirable to have a mechanically stable wall system having secure retaining means for maintaining connection of reinforcement members to the retaining wall.

SUMMARY OF THE INVENTION

Briefly described, the present invention relates to a segmental retaining wall system. This system comprises a plurality of wall blocks. Each wall block comprise an interior face for forming an interior surface of a segmental retaining wall, an exterior face for forming an exterior surface of the segmental retaining wall, first and second sides that extend from said exterior face to said interior face, a top surface, and a bottom surface. In addition, the wall block includes retaining means for retaining a reinforcement member to the segmental retaining wall. In one arrangement, these retaining means comprises a channel that is defined by a front wall, a rear wall, and a channel bottom surface. This channel is provided in one of the faces and surfaces of the block, and preferably includes at least one inwardly extending shoulder.

The objects, features, and advantages of this invention will become apparent upon reading the following specification, when taken in conjunction with the accompanying drawings.

DETAILED DESCRIPTION

Figure 1:
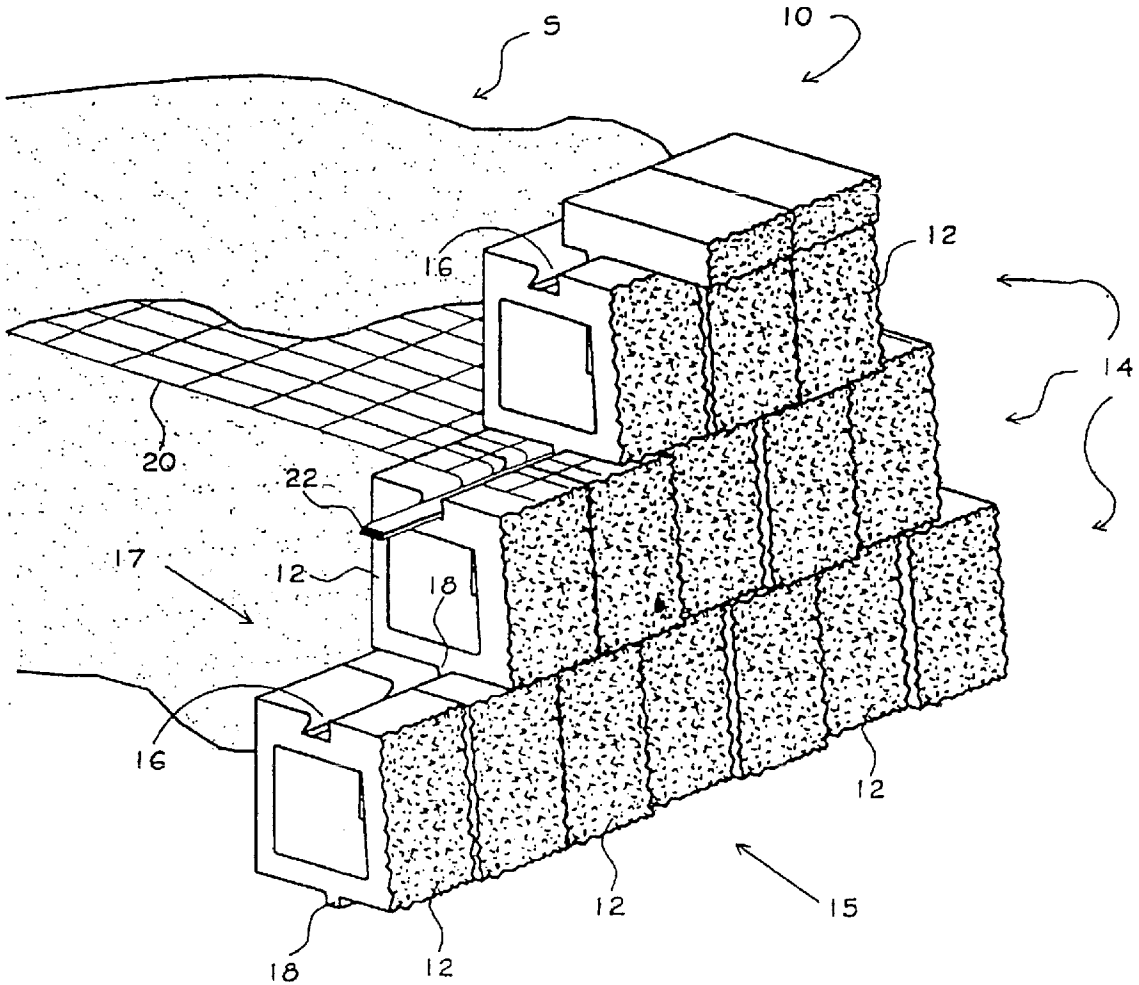
FIG. 1 is a perspective view of a retaining wall formed in accordance with the present invention.

Referring now in more detail to the drawings, in which like numerals indicate corresponding parts throughout the several views, FIG. 1 illustrates the general concept of a segmental gravity retaining wall 10 constructed in accordance with the present invention. As depicted in this figure, the retaining wall 10 comprises a plurality of wall blocks 12 that are stacked atop each other in ascending courses 14. When stacked in this manner, the wall blocks 12 together form an exterior or decorative surface 15 which faces outwardly away from the soil, and an interior surface 17 which faces inwardly toward the soil.

Figure 2:
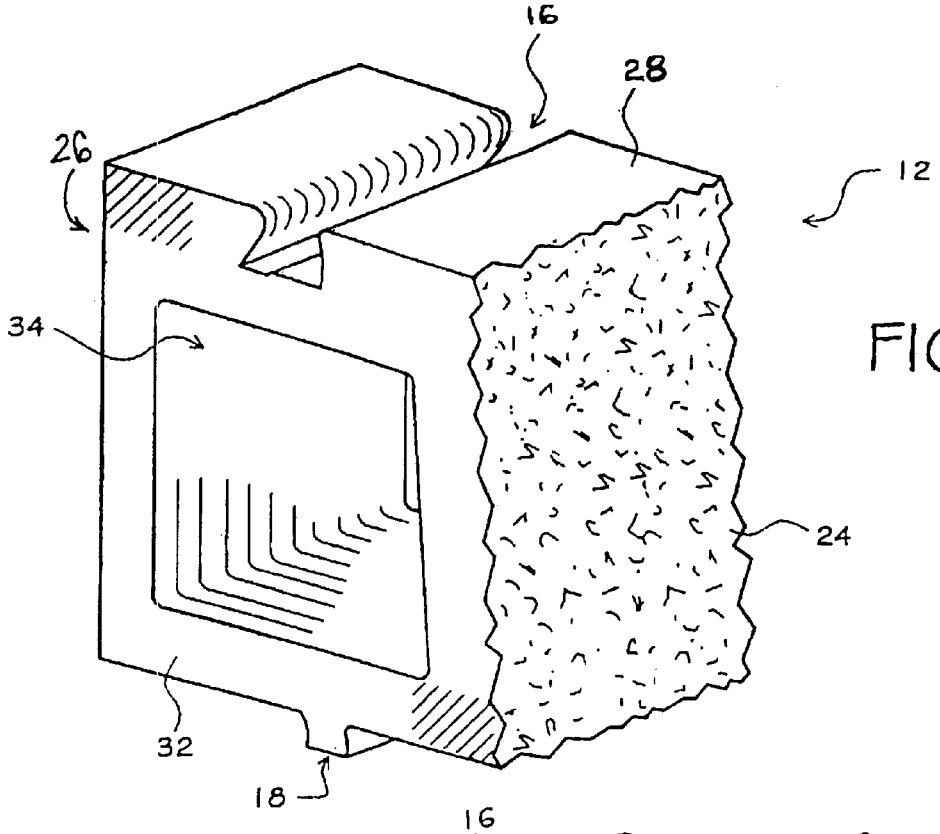
FIG. 2 is a perspective front view of a wall block used in the wall shown in FIG. 1.
Figure 3:
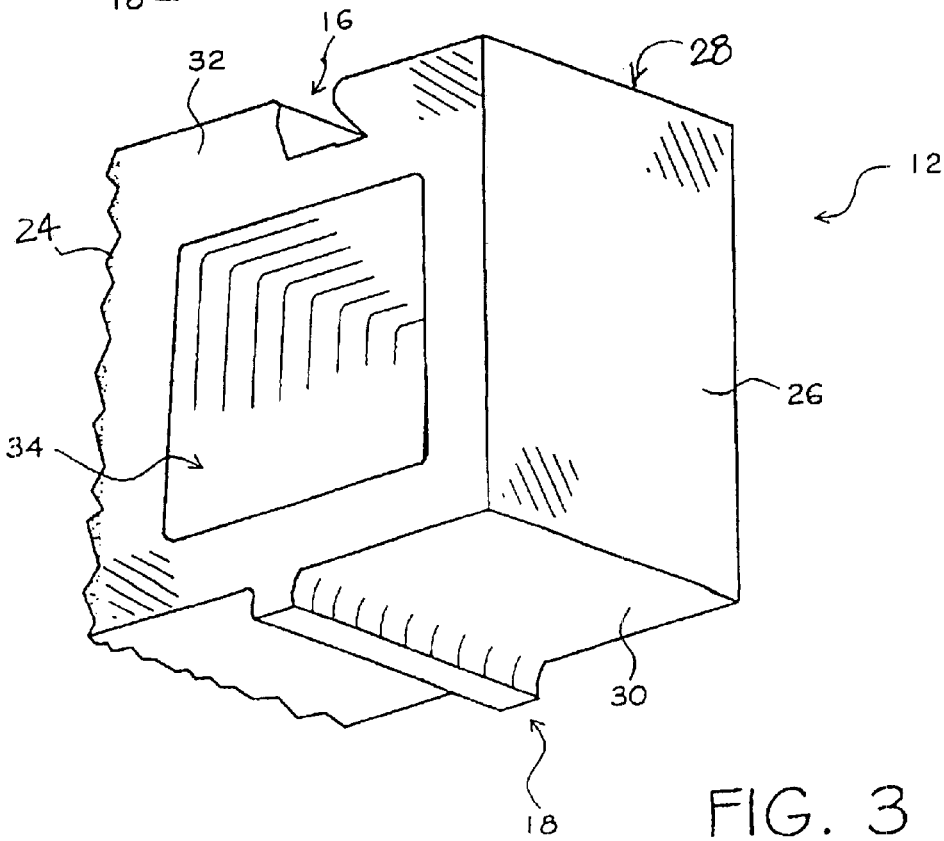
FIG. 3 is a perspective rear view of the wall block shown in FIG. 2.

Generally speaking, the wall blocks 12 are substantially identical in size and shape for ease of block fabrication and wall construction. Accordingly, each block 12 typically is configured so as to mate with vertically adjacent blocks when the blocks are stacked atop one another to form the retaining wall 10. Referring to FIGS. 2 and 3, each wall block 12 comprises an exterior face 24, an opposed interior face 26, a top surface 28, a bottom surface 30, and two opposed sides 32. Because the exterior faces 24 of the blocks 12 form the exterior surface 15 of the retaining wall 10, the exterior faces typically are provided with an ornamental texture or facing to create a visually pleasing facade. Also, the exterior face 24 of each wall block 12 is preferably sloped inwardly from the bottom surface 30 to the top surface 28 in an incline ratio of approximately 30 to 1. This inward slope of each block exterior surface 15 creates an aggregate inward slope effect over the entire retaining wall 10 which counteracts the outward leaning impression commonly created by such walls when viewed by the observer. Contrary to the exterior faces 24, the interior faces 26 of the wall blocks 12 normally are configured in an upright or vertical orientation and, therefore, form an upright interior surface 17 of the retaining wall 10.

The top and bottom surfaces 28 and 30 of each block 12 typically are parallel to each other so that, when stacked on top of one another, an upright wall 10 is formed. Similarly, the opposed sides 32 typically are parallel to each other. However, the opposed sides 32 can be inwardly or outwardly tapered from the exterior face 24 of the block 12 to the interior face 26 of the block to form curved walls of nearly any shape. Preferably, the wall blocks 12 further include interior openings 34 which reduce the amount of concrete or other materials needed to fabricate the blocks and reduce the weight of the blocks to simplify wall construction. Although depicted in the figures as being arranged in a horizontal orientation, these openings could be arranged in a vertical orientation, if desired.

Figure 4:
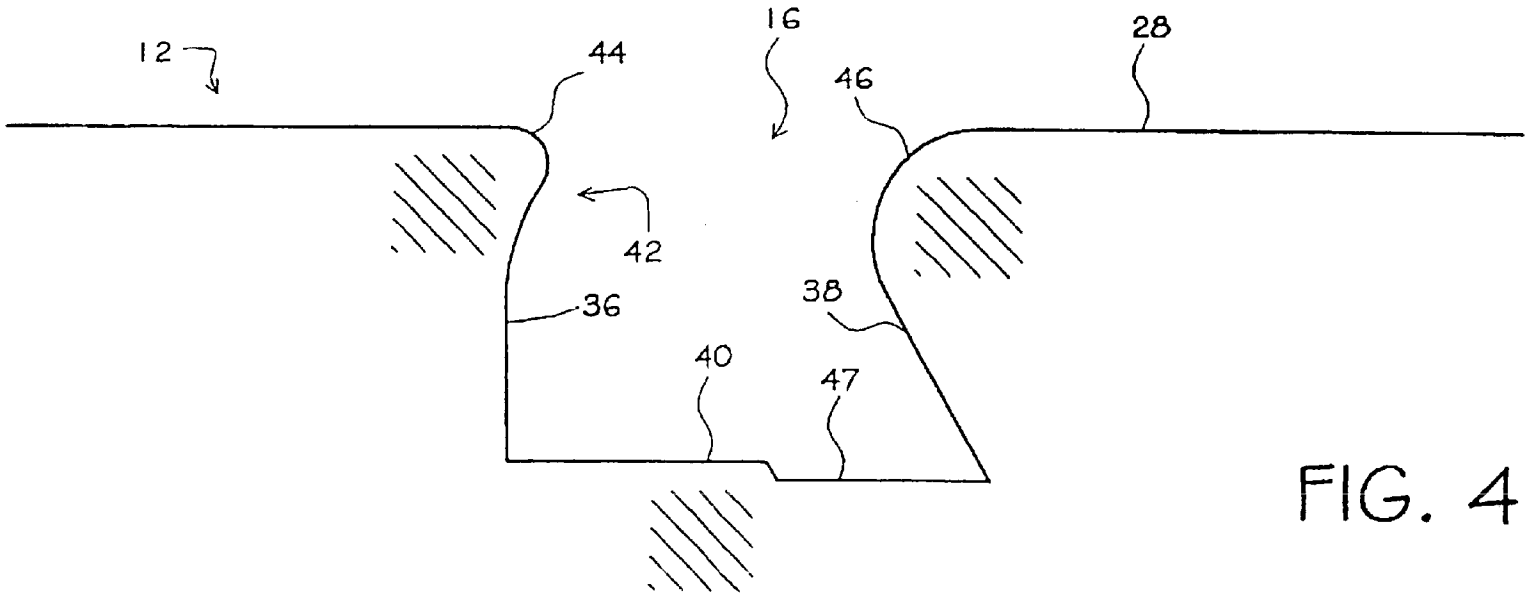
FIG. 4 is a detail view of a channel provided in a top surface of a wall block.

As mentioned above, the wall blocks 12 typically comprise retaining means for attaching reinforcement members (e.g., geogrid) to the retaining wall 10. These retaining means include a channel 16. Typically, each block 12 has a channel 16 provided in its top surface 28, although alternative placement is feasible. By way of example, the channel 16 alternatively could be provided in the bottom surface 30 or the interior face 26 of the wall block 12. When provided in the interior face 26 of the block 12, the channel 16 can be arranged either horizontally or vertically therein, although horizontal placement is preferred. When the channel 16 is provided in the top surface 28, however, the channel normally extends transversely across the block 12 from one side 32 of the block to the other, usually parallel to the exterior surface 15 of the block 12. As illustrated in FIG. 4, the channel 16 is defined by a front wall 36, a rear wall 38, and a channel bottom surface 40. The front wall 36 can include a shoulder 42 that extends inwardly toward the interior face 26 of the wall block 12. In a preferred embodiment, the shoulder 42 is arranged as a curved lip such that the channel comprises a first substantially arcuate edge 44.

Figure 5:
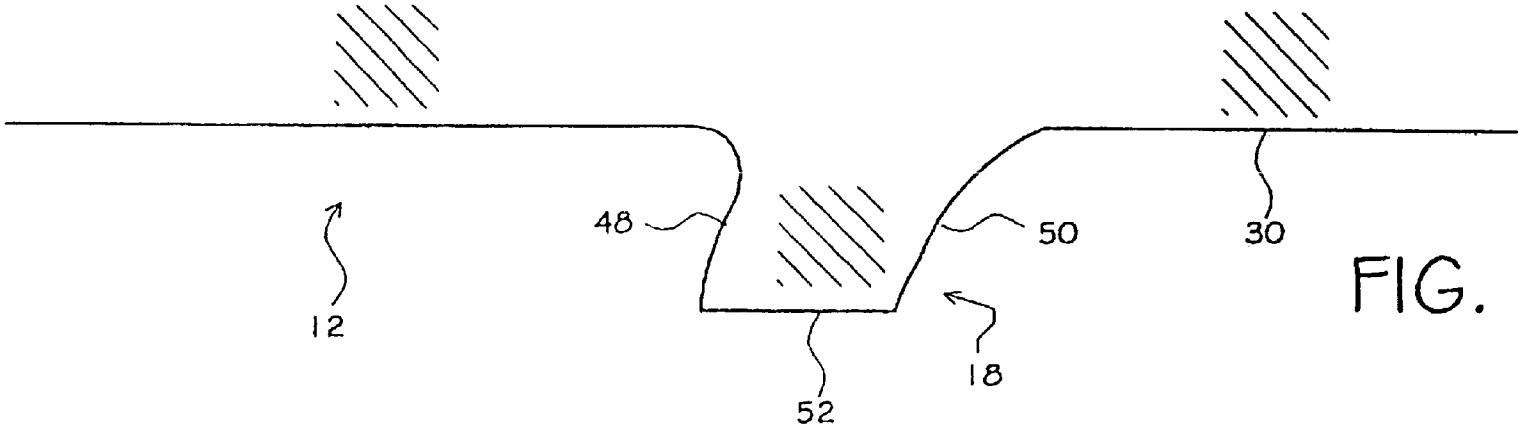
FIG. 5 is a detail view of a flange provided on a bottom surface of a wall block.
Figure 9:
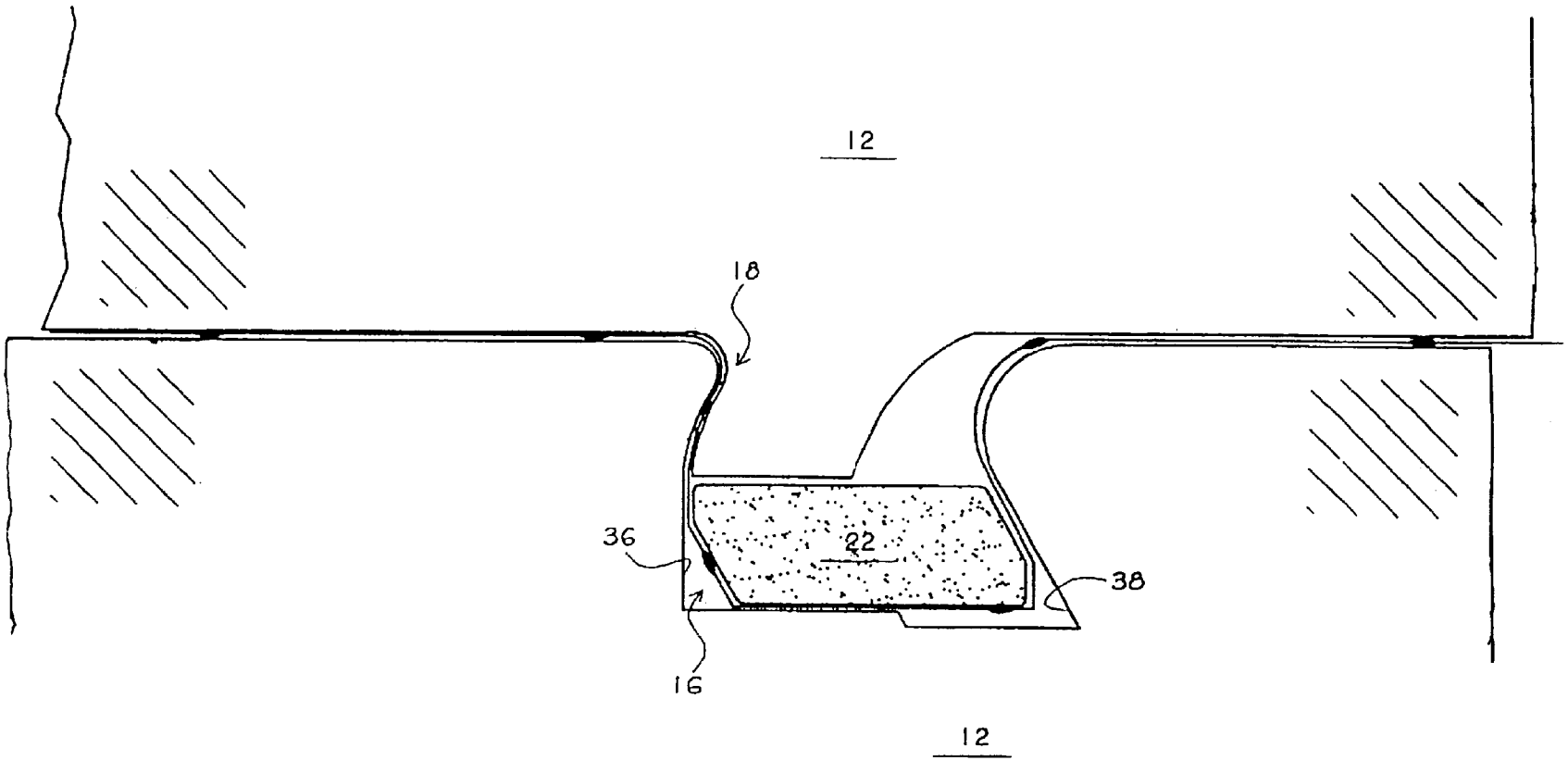
FIG. 9 is a detail view showing the retention of a reinforcement member between adjacent stacked wall blocks.

Positioned opposite the front wall 36, the rear wall 38 of the channel 16 preferably similarly includes an inwardly extending shoulder 45. The rear wall shoulder 45 preferably is arranged as a curved lip so as to form a second substantially arcuate edge 46 of the channel 16. Although the shoulders 42, 45 have been described herein as being arranged as curved lips, it will be apparent from the present disclosure that these shoulders alternatively could be arranged as inwardly extending flanges or other such protrusions. Furthermore, depending upon the particular implements used to retain the reinforcement members, the placement of the channel 16, and the degree of block-to-block locking desired, the walls 36, 38 can be formed without such shoulders 42, 45 to simplify block construction. For example, if the channel 16 is not used to facilitate block-to-block locking, the front wall 36 can be substantially planar in shape in that it does not serve the retaining function that the rear wall 38 serves (see FIG. 9).

Where block-to-block locking is desired, the front wall 36 typically includes a shoulder 42 that is adapted to receive a flange 18 that extends from the block 12. In a preferred embodiment, the flange 18 is provided on the bottom surface 30 of the block 12 and, like the channel 16, extends transversely from one side 32 of the block to the other side 32. As is illustrated in FIG. 5, the flange 18 is defined by a front surface 48, a rear surface 50, and a bottom surface 52. Both the front surface 48 and the rear surface 50 extend toward the exterior face 24 of the wall block 12 such that the entire flange 18 extends towards the exterior face 24 of the block. To provide for the interlocking between vertically adjacent wall blocks 12, the blocks can be placed on top of tower wall blocks 12 such that the flanges 18 extend into the channels 16. Once so situated, the upper wall blocks can be urged forward along the lower blocks so that the front surfaces 48 of the flanges 18 abut the front walls 36 of the channels 16. This abutment prevents the block from leaning forward or toppling. As is known in the art, alternative locking means can be used such as pin and cavity, protrusion and cavity, mating/aligning systems. Example systems include these of U.S. Pat. Nos. 4,914,876, 5,257,880, 5,607,262, and 5,827,015.

Figure 6:
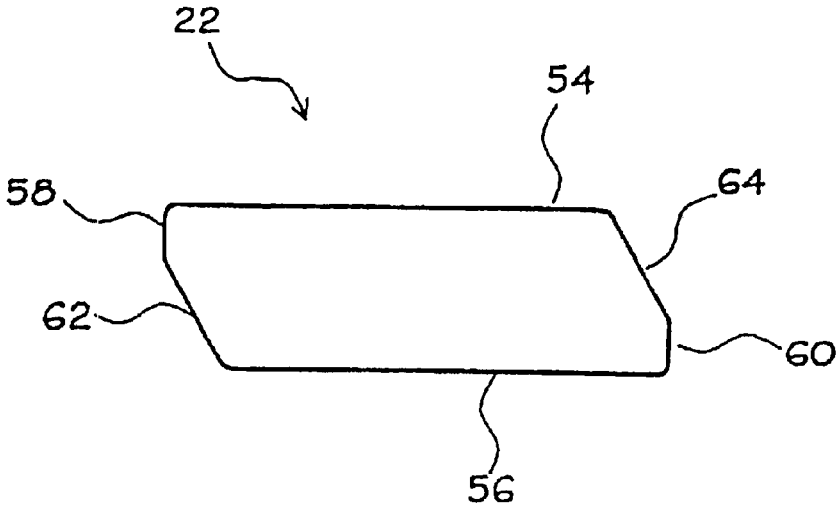
FIG. 6 is a side view of a reinforcement member retaining bar.
Figure 7:
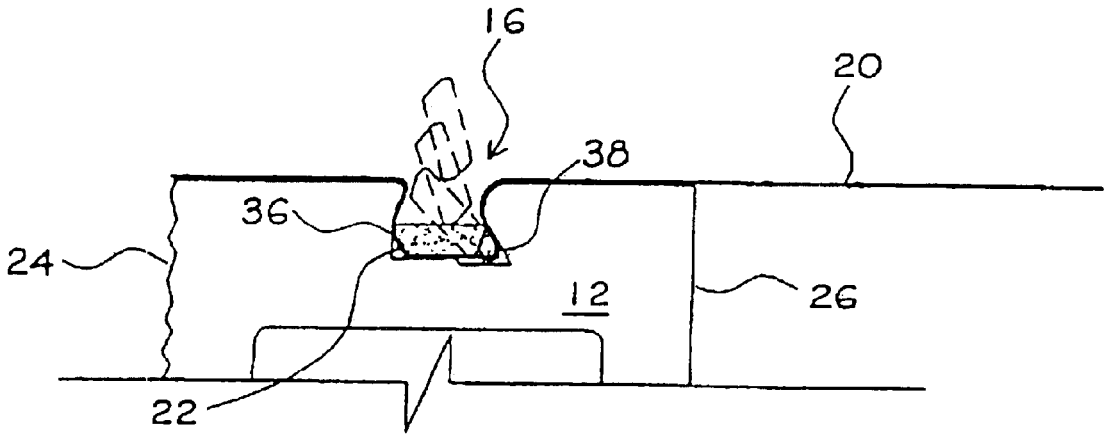
FIG. 7 is a partial side view of a wall block depicting insertion of the retaining bar shown in FIG. 6 over a reinforcement member within a channel of the wall block.

The retaining means of the disclosed system typically further include a reinforcement member retaining bar 22, shown most clearly in FIG. 6. As indicated in this figure, the retaining bar 22 specifically is sized and configured to fit within the channel 16. In a preferred arrangement, the retaining bar 22 has a plurality of different surfaces: a top surface 54, a bottom surface 56, a first upright surface 58, a second upright surface 60, a first oblique surface 62, and a second oblique surface 64. Normally, the top surface 54 and the bottom surface 56 are parallel to each other as are the first oblique surface 62 and the second oblique surface 64. Similarly, the first upright surface 58 and the second upright surface 60 typically are parallel to each other such that the first upright surface extends perpendicular from the top surface 54 and the second upright surface extends perpendicularly from the bottom surface 56. Configured in this manner, the retaining bar 22 can be positioned on top of a reinforcement member 20 in the channels 16 by inserting the retaining bar into the channels with the second upright surface 60 forward, and twisting the bar downwardly into place as depicted in FIG. 7. In that the bar 22 is designed to fit closely between the front and rear walls 36 and 38 of the channels 16 when in place, a longitudinal notch 46 is provided in the channel 16 to accommodate the second upright surface 60 during the twisting and downward insertion of the bar.

Once correctly inserted within the channel 16, the first upright surface 58 and the second oblique surface 64 of the retaining bar 22 hold the reinforcement member 20 against the front and rear walls 36 and 38 of the channel, respectively, as shown in FIG. 7. In embodiments in which the flange 18 is not provided, the channel 16 can have a relatively shallow depth dimension. The retaining bar 22 prevents the reinforcement member 20 from being pulled out from the retaining wall 10. Specifically, when a tensile force is applied to the reinforcement member 20 from the soil side of the retaining wall 10, the retaining bar 22 is rotated within the channel 16 to cause the reinforcement member to be clamped by member 20 to the sides of the channel, locking the reinforcement member in place. In that the amount of pressure that is applied on the retaining bar 22 is not large, the retaining bar can be constructed of a polymeric material such as nylon 6,6 or high density polyethylene. Use of such a polymeric material provides the additional advantage of providing for a lightweight, inert retaining bar.

Figure 8:
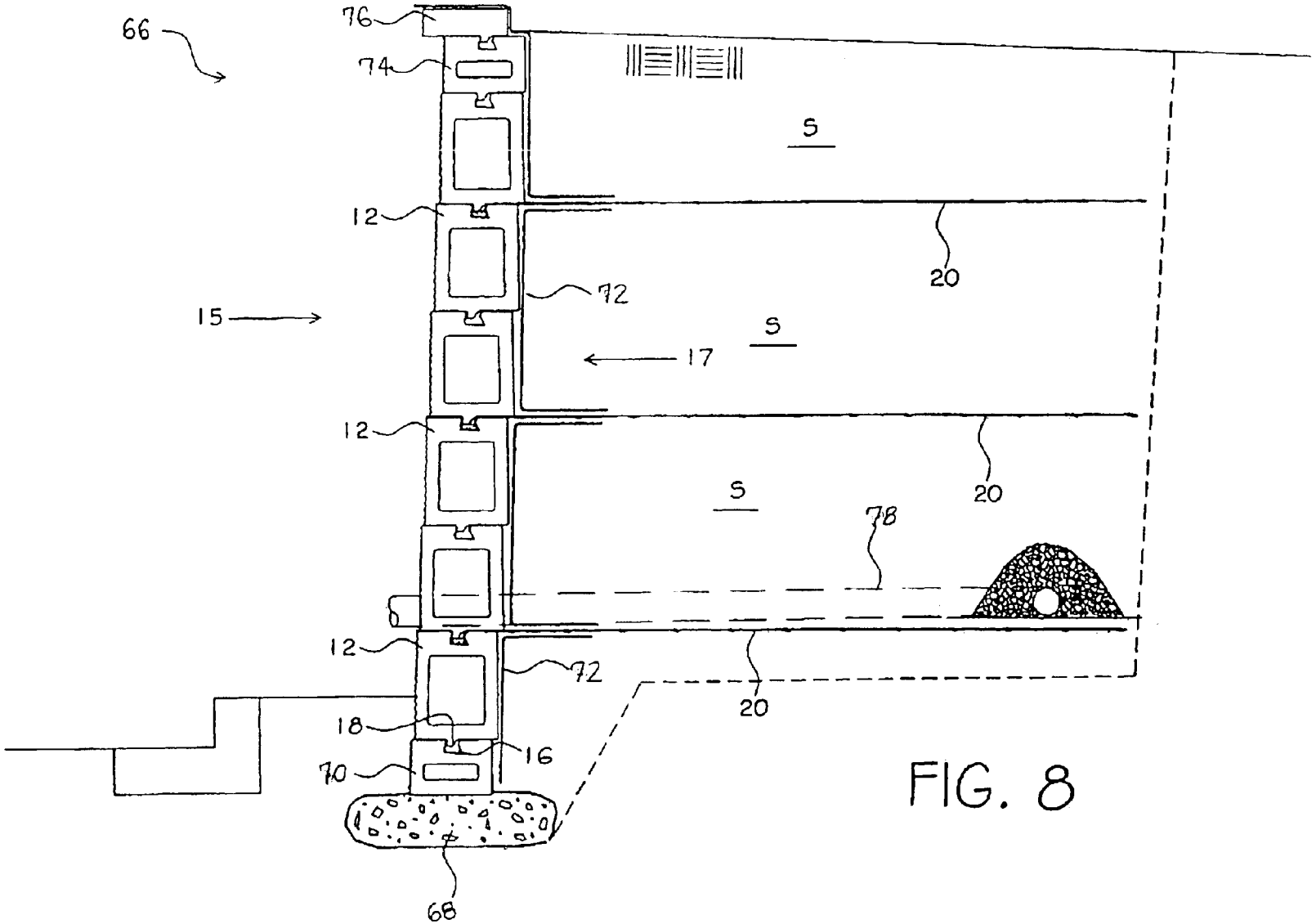
FIG. 8 is a cross-sectional side view of a retaining wall constructed in accordance with the present invention.

The system of the present invention can be used to construct any number of different configurations of segmental retaining walls. FIG. 8 illustrates one example of such a retaining wall 66. To construct such a wall 66, a leveling pad 68 is laid to provide a foundation upon which to build the wall. Typically, this leveling pad 68 comprises a layer of compacted, crushed stone that is embedded under the soil to protect the wall foundation. Once the leveling pad 68 is laid and compacted, a plurality of starting blocks 70 are aligned along the length of the pad. Each of the starting blocks 70 is provided with a channel in its top surface. However, since there are no lower courses with which to engage, the starter blocks 70 are not provided with flanges, or existing flanges on the block can be broken off with a hammer. Additionally, special starting blocks (if used) can be relatively short in height, typically being approximately half as tall as the wall blocks. Although such starting blocks 70 typically are used in the starting course of the retaining wall, it is to be noted that the standard wall blocks 12 could be used to form this course, if desired.

After the starting course has been formed with either the starting blocks 70 or wall blocks 12, the next course of blocks can be laid. The wall blocks 12 are placed on top of the blocks of the starting course with the flanges 18, if provided, extending into the channels 16 of the lower blocks. As can be appreciated from FIG. 8, and with reference to FIGS. 4 and 5, the front surfaces 48 of the flanges mate with the front wall shoulders 42 of the channels 16 such that each flange 18 extends underneath the shoulders. This mating relationship holds the wall block 12 in place atop the lower blocks and prevents the wall block from tipping forward, thereby providing integral locking means for the block.

Once the first wall course has been formed atop the starting course, backfill soil, S, can be placed behind the blocks 12. Typically, a non-woven filter fabric 72 is provided between the wall 66 and the backfill soils to prevent the introduction of particulate matter between the courses of blocks due to water migration within the soil. Alternatively, a layer of gravel aggregate can be provided between the wall and the soil to serve the same function. Additional ascending courses thereafter are laid in the manner described above. Although alternative configurations are possible, a reinforcement member 20 typically is laid between every other course of blocks 12 as indicated in FIG. 8. It will be appreciated, however, that greater or fewer reinforcement members 20 can be provided depending upon the particular reinforcment needs of the construction site. Preferably, these reinforcement members 20 are composed of a flexible polymeric fabric. As described above, the reinforcment members 20 are positioned so that they extend from the exterior surface 15 of the retaining wall, into the channel 16, and past the exterior surface 17 of the retaining wall to extend into the soil. As shown most clearly in FIG. 9, a reinforcement member retaining bar 22 is placed on top of the reinforcement member 20 in the channel 16. When the next course of blocks 12 is laid on top of the lower course, the flange 18 of the upper blocks extends into the channel 16 adjacent the retaining bar.

Construction of the retaining wall 66 continues in this manner until the desired height is attained. As indicated in FIG. 8, the inward slope of the wall blocks 12 creates a net inward slope of the retaining wall. Additionally, the configuration the blocks 12 creates an aesthetically pleasing stepped appearance for the exterior surface of the wall 66. Where the full height of a wall block 12 is unnecessary or not desired, short wall blocks 74 can be used to form the top course. Typically, these short wall blocks 74 are approximately half the height of the standard wall blocks 12. Once the retaining wall 66 has been raised to the required height, cap blocks 76 can be used to complete the wall. As shown in FIG. 8, these cap blocks 76 can be provided with a flange 18, but do not have an upper channel in that further construction will not be conducted. Normally, the cap blocks 76 are fixed in position with concrete adhesive and the top surface of the cap blocks are provided with an ornamental pattern similar to the exterior faces of the blocks. The cap block 76 is designed to extend out over the lower block to provide a lip for aesthetics. Additionally, a subsurface collector drain 78 can be provided within the backfill soil to remove excess water collected therein.

While preferred embodiments of the invention have been disclosed in detail in the foregoing description and drawings, it will be understood by those skilled in the art that variations and modifications thereof can be made without departing from the spirit and scope of the invention as set forth in the following claims. For instance, although particular block configurations have been identified herein, persons having ordinary skill in the art will appreciate that the concepts disclosed herein, in particular the retaining means described herein, are applicable to prior and future wall block designs.

What is claimed is:

1. A wall block for use in a segmental retaining wall system, said wall block comprising:

an interior *block* face for forming an interior surface of a segmental retaining wall;

an exterior *block* face for forming an exterior surface of the segmental retaining wall;

first and second *block* sides that extend from said exterior *block* face to said interior *block* face;

a *block* top surface [and] *having a lock channel formed therein, the lock channel being defined by a channel front wall, a channel rear wall, and a channel bottom surface, the lock channel extending transversely across the block top surface from the first block side to the second block side, wherein the channel front wall forms a first shoulder that extends towards the interior block face so as to overhang a portion of the channel front wall, wherein the channel rear wall forms a second shoulder that extends towards the exterior block face so as to overhang a portion of the channel rear wall, and wherein the shoulders are spaced apart and run generally parallel to each other along the lock channel;* a *block* bottom surface; and

[a channel defined by a front wall, a rear wall, and a channel bottom surface and extending across one of said faces and surfaces, said rear wall including an inwardly extending shoulder.] *a lock flange on the bottom surface of the block, the lock flange being defined by a flange front surface extending from the block bottom surface, a flange rear surface extending from the block bottom surface, and a flange bottom surface extending between the flange front and rear surfaces, the lock flange extending transversely across the block bottom surface in substantially the same direction as the lock channel, the lock flange being sized, shaped, and positioned so that the flange will fit into the lock channel of a similarly configured wall block in an adjacent lower course when the lock flange is passed downwardly through the space between the first and second shoulders of the similarly configured wall block and into the lock channel of that wall block from above, and wherein the flange front surface includes a portion that is sized and shaped so as to*

*engage the first shoulder of the lock channel of the similarly configured block either directly, or indirectly if a portion of a soil reinforcement member is interposed between the flange front and the first shoulder, such that when the wall block is stacked atop the similarly configured block the wall block is properly aligned thereon.*

2. The wall block of claim 1, wherein [said channel is formed in said top surface of said wall block.] *the flange front surface includes a portion that extends towards the exterior block face so as to overhang a portion of the flange front surface and is sized and shaped so as to engage the first shoulder of the lock channel of the similarly configured block either directly, or indirectly if a portion of the soil reinforcement member is interposed between the flange front surface and the first shoulder, such that when the wall block is stacked atop the similarly configured block, the engagement between the lock flange and the lock channel of the similarly configured block resists forward leaning or toppling of the wall block.*

[3. The wall block of claim 2, wherein said channel extends transversely across said top surface from said first side to said second side of said wall block.]

4. The wall block of claim 1, wherein [said rear wall] *the second* shoulder is formed as a curved lip.

5. The wall block of claim 1, wherein said channel is adapted to receive a reinforcement member retaining bar.

[6. The wall block of claim 1, wherein said front wall of said channel includes an inwardly extending shoulder.]

7. The wall block of claim [6] *1*, wherein [said front wall] *the first* shoulder is formed as a curved lip.

[8. The wall block of claim 1, further comprising a flange that is sized and configured so as to mate with a channel of another of said blocks.]

[9. The wall block of claim 8, wherein said flange is provided on said bottom surface of said wall block.]

10. The wall block of claim 1, wherein said wall block is formed of a concrete material.

11. A segmental retaining wall system comprising:

a wall block including:

an interior face for forming an interior surface of a segmental retaining wall;

an exterior face for forming an exterior surface of the segmental retaining wall;

first and second sides that extend from said exterior face to said interior face;

a top surface and a bottom surface; and retaining means for retaining a reinforcement member to the wall block, said retaining means including a channel defined by a front wall, a rear wall, and a channel bottom surface and extending across one of said wall block faces and surfaces, at least one of said front wall and rear wall having an inwardly extending shoulder associated therewith.

12. The system of claim 11, wherein said retaining means comprises a retaining bar that is sized and configured to fit within said channel.

13. The system of claim 12, wherein said channel extends transversely across said top surface from said first side to said second side of said wall block.

14. The system of claim 13, wherein said inwardly extending shoulder is associated with said rear wall of said channel.

15. The system of claim 14, wherein said rear wall shoulder is formed as a curved lip.

16. The system of claim 13 wherein the inwardly extending shoulder is associated with said front wall of said channel.

17. The system of claims 11, 14, or 16 wherein said inwardly extending shoulder is integrally formed with its associated channel wall.

18. The system of claim 13 wherein an inwardly extending shoulder is associated with said front wall of said channel and an inwardly extending shoulder is associated with said rear wall of said channel.

19. The system of claim 18 wherein each inwardly extending shoulder is integrally formed with its associated channel wall.

20. The system of claim 11, wherein said wall block is formed of a concrete material.

21. A method for forming a segmental retaining wall, said method comprising the steps of:

stacking a plurality of wall blocks in aligned courses, a plurality of said wall blocks having a channel formed therein, the channel including at least one inwardly extending shoulder; and securing at least one reinforcement member to the wall with a retaining bar that overlaps the reinforcement member within the channel;

wherein the retaining bar in cooperation with the channel secures the reinforcement member to the wall when tensile forces are imposed upon the reinforcement member.

22. The method of claim 21, wherein the at least one inwardly extending shoulder is formed with a curved lip.

* * * * *